April 11, 1950     J. G. MADSON     2,503,283

MECHANICAL AUTOMATIC STOP FOR TURRET LATHES

Filed May 23, 1945     3 Sheets-Sheet 1

Inventor
JOHN G. MADSON

By Ralph L. Chappell
Attorney

April 11, 1950  J. G. MADSON  2,503,283
MECHANICAL AUTOMATIC STOP FOR TURRET LATHES
Filed May 23, 1945  3 Sheets-Sheet 2
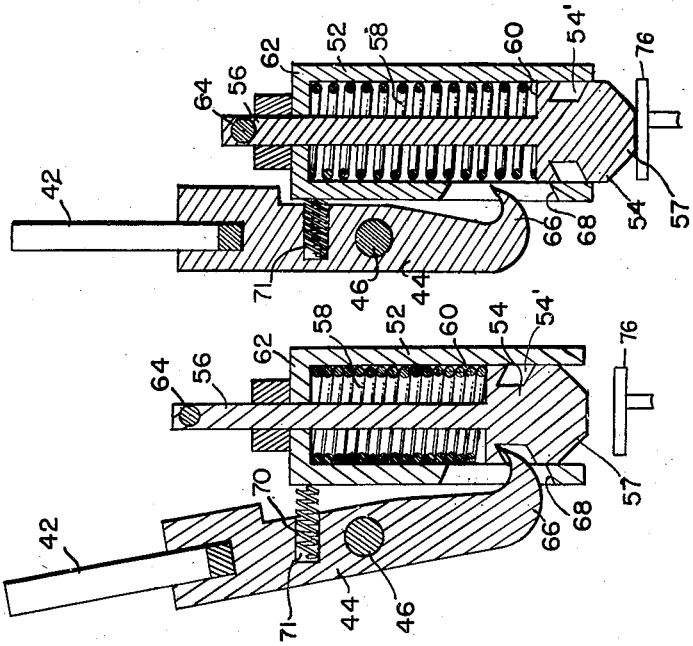
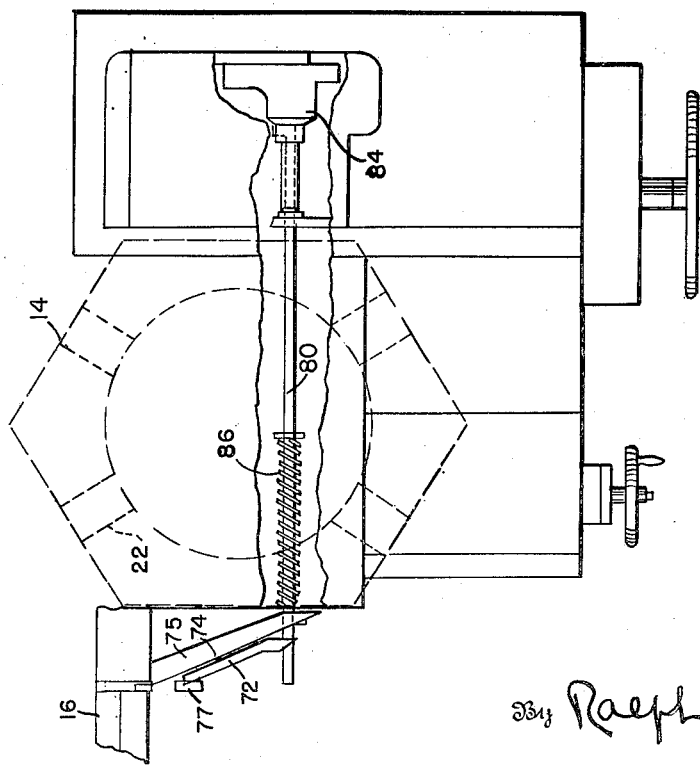
Inventor
JOHN G. MADSON
By Ralph L. Chappell
Attorney April 11, 1950     J. G. MADSON     2,503,283
MECHANICAL AUTOMATIC STOP FOR TURRET LATHES
Filed May 23, 1945     3 Sheets-Sheet 3

Inventor
JOHN G. MADSON

Patented Apr. 11, 1950

2,503,283

UNITED STATES PATENT OFFICE 2,503,283

MECHANICAL AUTOMATIC STOP FOR TURRET LATHES

John George Madson, United States Navy

Application May 23, 1945, Serial No. 595,376

1 Claim. (Cl. 29—65)

(Granted under the act of March 3, 1883, as amended April 30, 1928; 370 O. G. 757)

This invention relates to lathes and more specifically to an automatic stop for use with lathes of the type which employ a power feed.

In the lathe illustrated herein, the work is fixed at one end in a chuck for rotation about its longitudinal axis, and a cutting tool is fixed in a turret which is adapted to be moved progressively toward the chuck during the cutting operation. It is to be observed, however, that the turret may be fixed and the chuck moved to advance the work toward the tool and accomplish the same result. As thus set up, the tool is adjustably positioned at a given radial distance from the axis of the work so as to take off the desired amount of stock from its surface, and as the work moves along, the turned-down or finished portion thereof passes through an opening formed in the turret. To prevent the finished work from bending due to the lateral thrust produced by the cutting tool, there are provided a pair of bearings adjacent to the tool which are adapted tangentially to engage the surface of the finished work at substantially equally spaced points opposite the tool. The cutting edge of the tool is slightly ahead of the bearings so that the unturned stock never quite reaches the bearings. If, however, the tool breaks or slips out of place, the unturned portion of the work will strike the bearings due to the continued forward feed of the turret and smash them.

It is an object of this invention to provide an automatic stop adapted to declutch a power lathe if the cutting tool breaks or slips out of position, to prevent damage to the lathe tool kit which consists of the tool and bearings referred to above, the stop being of simple design and readily adaptable to existing equipment without undue change therein.

In a lathe of the type referred to, there is a work-piece holder in the nature of a chuck rotatable about a horizontal axis, a turret adapted to hold a tool, the turret being movable toward the work holder or chuck, bearings associated with the tool to engage the tooled work to prevent bending thereof due to the action of the tool, and the invention resides in the combination with the aforesaid elements of means adjacent to the plane of the end faces of the bearings tangent to a circle defined by the edges of the cutting tool and the points of tangency between the tooled work and the bearings, the aforesaid means being adapted upon being engaged by a portion of the work lying outside of said circle to stop the lathe. More specifically, the aforesaid means comprises an arm arranged between the plane of the end faces of the bearings and a plane parallel thereto passing through the cutting edge of the tool in a position to be engaged by any irregularity in the work, and to release a plunger which is held retracted thereby, the plunger when released, being adapted to effect disengagement of a clutch which connects the lathe to a source of power, so that the lathe will stop before damage is done to the bearings.

The invention will now be described with reference to the accompanying drawings, in which:

Fig. 5 is a plan view of the turret, drive gear housing and automatic stop showing the clutch rod and retaining latch;

Fig. 6 is a section through the stop mechanism showing a loaded condition;

Fig. 7 is a section through the stop mechanism showing it in a released condition.

Figure 1:
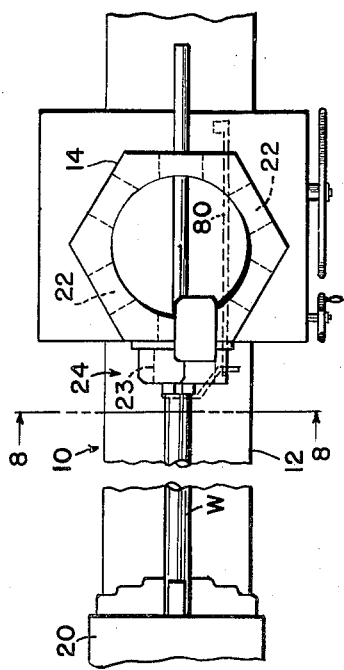
Fig. 1 is a top view of the chuck and turret of a power lathe with which my novel automatic stop is used.
Figure 2:
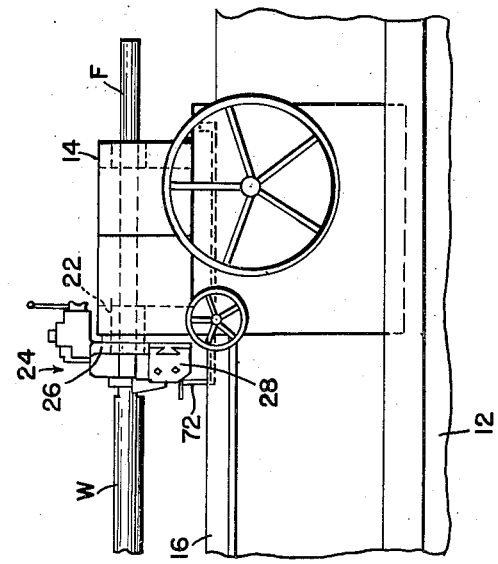
Fig. 2 is a side elevation of the lathe showing part of the base and the turret.
Figure 8:
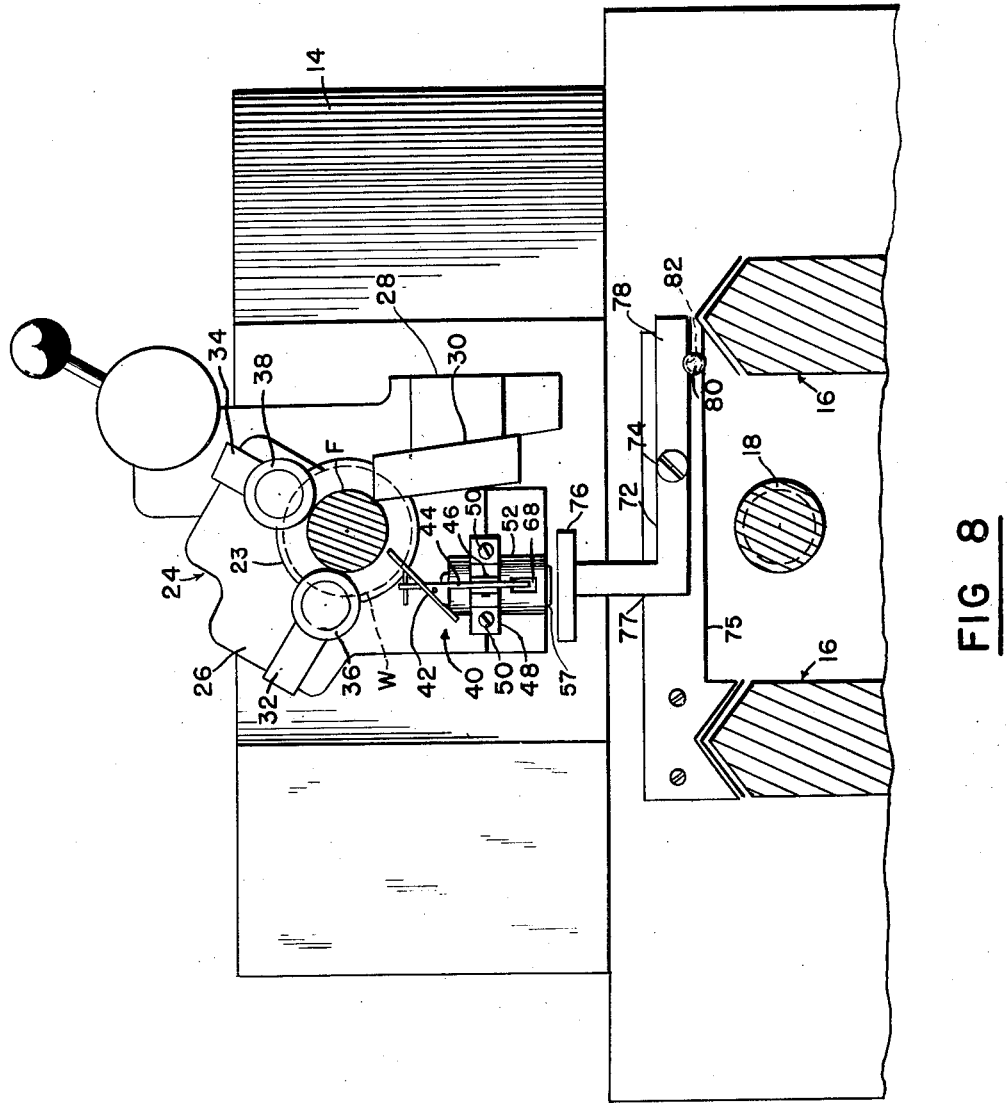
Fig. 8 is a transverse view of the lathe on the line 8—8 of Fig. 1, showing the automatic stop mounted on the face of the tool kit.

Referring to Fig. 1, there is shown a power lathe 10 comprising a base 12, a turret 14 which is adapted to be moved along parallel tracks 16, Fig. 8, by means of a screw 18 toward a stationary chuck 20 which is adapted to hold a piece of work W at one end for rotation about its longitudinal axis with respect to a tool fixed to the turret. The turret 14 is six sided, is hollow and has diametrically disposed openings 22 therein passing through the center of each pair of parallel faces through which the work-piece passes as the turret advances toward the chuck. The tool kit which carries the cutting tool, is indicated at 24 and is fastened to one of the faces of the turret. Other tools may be fastened to the other faces of the turret which may be rotated to bring any one of the tools into a position to operate upon the work, however, only the one tool, which will be described hereinafter, is necessary for a complete understanding of the present invention. The tool kit 24 comprises a plate 26 bolted to one face of the turret over one opening 22 and has an opening 23 therein concentric with the opening 22. In the lower portion of the plate there is slidably mounted for movement in a horizontal plane, a slide member 28 to which there is adjustably fixed a cutting tool 30. Also slidably mounted in the plate 26 are a pair of slide members 32 and 34, Fig. 8, having mounted thereon bearings 36 and 38 rotatable about horizontal axes normal to the plane of the plate 26. The slide members 32 and 34 are so arranged that they may be adjusted radially with respect to the axis of rotation of the chuck 20. If the rough or unfinished work W is clamped in the chuck 20, Fig. 1, with its free end adjacent to the cutting tool 30 and then the cutter tool is adjusted to take off the desired amount from the surface of the work as it is rotated by the chuck, the pressure created during the cutting operation is such that it would deflect the work since it is supported only at one end, and hence, the surface obtained would not be true. To avoid this, and to insure an accurate tooling, the bearings 36 and 38 described, are adjusted radially inward to engage the finished surface F of the work, as indicated in Fig. 8, thereby to engage and support the work as it passes through openings 23 and 22 in the plate 26 and turret face respectively.

These bearings 36 and 38 are precision ground and damage to these bearings is an expensive matter. As is clearly apparent from Figs. 3 and 8, if for any reason the tool 30 should be broken or become displaced so that it does not remove the metal to the depth for which the tool was initially set, the uncut portion of the work will strike these bearings 34 and 38 and damage them, because the bearings are set in at the same radial depth as the cutting tool and feed forward regardless of the fact that the tool is not cutting properly.

Figure 3:
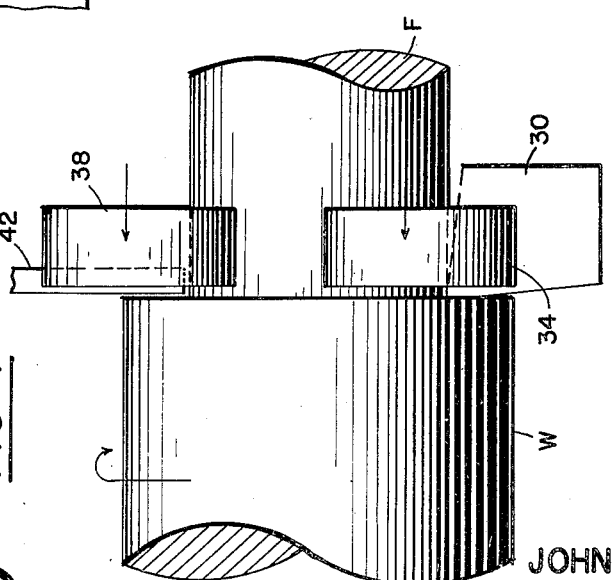
Fig. 3 is an enlarged segmental view of a piece of work before and after turning, showing the relative positions of the cutting tool, bearings and the work engaging portion of my stop.
Figure 4:
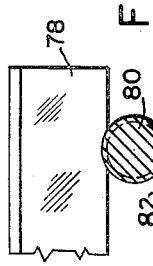
Fig. 4 is a fragmentary detail of a latch for retaining the clutch in engagement.

It is to prevent such damage to the bearings that the automatic stop for the present invention was devised. This stop indicated generally by the reference character 40, comprises an arm 42 arranged adjacent to the bearings 34 and 38, and as seen in Figs. 3 and 8, slightly in advance of the plane of the forward faces of the bearings and just back of a plane parallel thereto passing through the cutting edge of the tool. Hence, if the work W is not cut down to the diameter shown at F, the shoulder left between the reduced diameter F and the original diameter W will strike the arm 42 before it reaches the forward faces of the bearings 36 and 38. The arm 42 is fixed to a member 44, the latter being pivoted at 46 between the ends of a bracket 48, for tilting movement in a vertical plane running longitudinally of the lathe, the bracket in turn being secured by bolts 60 to the face of the plate 26. Clamped to the plate 26 by means of the aforesaid bracket 48, there is a cylindrical sleeve 52. The upper end of sleeve 52 is closed, Figs. 6 and 7, and the lower end is open and there is disposed therein, a plunger 54 to which there is fixed a rod 56 which extends through the upper closed end of the sleeve 52. The plunger 54 is yieldably urged toward the lower opened end of the sleeve 52 by a coil spring 58 surrounding the rod 56 between the rear surface 60 of the plunger 54 and the upper closed end 62 of the sleeve 52. A rod 64 is fixed transversely of the rod 56 and provides a hand-hold for drawing the plunger 54 into the sleeve 52 so that its lower surface 57 is flush with the end of the sleeve to compress the spring 58. As thus retracted, the plunger is in a cocked position and to hold it in this cocked position, the lower end of the member 44 is provided with a hook 66 adapted to engage an annular recess 54' formed on plunger 54, an aperture 68 being provided in the wall of the sleeve 52 through which the hook projects. The hook may be brought into engagement with the annular recess to cock the automatic stop by retracting the plunger against the spring 58 and tilting the member 44 so that the hook projects inwardly through the aperture 68. A spring 70 set into a recess 71 formed in the member 44 is adapted to bear against the surface of the sleeve 52 and yieldably to hold the member 44 in its cocked position. Below the sleeve 52 and plunger 54, there is disposed a horizontal lever 72 pivoted by a bolt 74 to a bracket 75, Fig. 5, the latter being fastened in a horizontal position to the bed of the lathe and extending transversely thereof, as more clearly shown in Fig. 8. One end of the lever 72 terminates in a vertical extension 77 having a horizontal plate 76 attached thereto which is adjacent to the bottom face 57 of the plunger 54, as seen in Figs. 6, 7 and 8. The opposite end of the lever 72 terminates in a portion 78, the lower edge of which is adapted to seat in a recess or slot 82 formed transversely of a rod 82, Figs. 4 and 8. The rod 82 extends rearwardly of the turret, as shown in Fig. 5, and is connected in the customary fashion to a clutch indicated generally at 84, which controls the operation of the lathe, the rod being held in an operative position, that is, with the clutch engaged by means of the terminal end 78 of the lever 72 which engages the slot 80. A coiled spring 86, surrounding the rod 80, urges it rearwardly to disengage the clutch. It is apparent from the aforesaid construction, that if the lever 72 is tipped in a counterclockwise direction, as viewed in Fig. 8, to disengage the terminal portion 78 from the slot 82, the rod 80 will be released and will be moved rearwardly by the spring 86 in the direction of the clutch 84, as shown in Fig. 5 to declutch the lathe and cause it to stop.

In operation, the machine is initially adjusted so that the cutting tool 30 will take off the required amount of stock from the rough piece W, for example, reduces its diameter to that shown at F, as shown in Fig. 3. As soon as the initial cut is made, the bearings 36 and 38 are adjusted inwardly so that they are in tangential contact with the newly cut surface F, as shown in Fig. 8 and hence, support the free end of the work against the forces produced by the cutting action of the cutter 30. The automatic stop is then set by retracting the plunger 54, this being done by grasping the hand hold 64 and pulling the rod 56 upwardly and then tipping the member 44 inwardly to engage the hook 66 with the annular recess 54 in the plunger 54. This will bring the arm 42 into the position shown in Fig. 3, with one surface thereof slightly in advance of the plane of the forward surfaces of the bearings 36 and 38. As thus set up, if for any reason, the tool 30 breaks or is dislocated so that it does not remove stock down to the diameter F, the uncut portion of the work will strike the arm 42 and tip it about its pivot 46, thereby disengaging the hook 66 from the annular recess 54' on the plunger 54. When this occurs, the spring 58 being released will force the plunger 54 downwardly, Fig. 7, and hence, tip the lever 72 in a counter-clockwise direction about its pivot 74, thereby removing the terminal end 78 from the slot 82. This releases the rod 80 which will fly rearwardly under the influence of the spring 86 to disengage the clutch 84 and stop the lathe before the uncut portion of the work reaches the bearings 36 and 38, and hence, no damage will take place.

The invention described herein may be manufactured and used by or for the Government of the United States of America for governmental purposes without the payment of any royalties thereon or therefor.

What is claimed is:

In a power driven lathe having a rotatably supported workpiece, a cutting tool relatively fed to the same in the direction of the longitudinal axis of the workpiece, steadying bearings adapted to engage a finished portion of the work rearwardly of a cutting tool and a power source for the lathe, the combination therein of a sleeve fixed to the lathe, a plunger slidable therein, spring means within the sleeve biasing the plunger in one direction, a member pivoted on said sleeve and adapted to engage said plunger for latching the plunger when it is moved to a cocked position against said spring, an arm on said member having a portion adapted to be positioned in the cut between the tool and bearings for engagement by an uncut portion of the workpiece in the event of casualty to the cutting operation to actuate said member to unlatch the plunger, and eans including a clutch actuating element in the path of said plunger and adapted to be actuated by the same upon the release of the same to thereby declutch the lathe from the power source.

JOHN GEORGE MADSON.

REFERENCES CITED

The following references are of record in the file of this patent:

UNITED STATES PATENTS

| Number | Name | Date |
| --- | --- | --- |
| 775,109 | Hanson | Nov. 15, 1904 |
| 1,869,114 | Phelps | July 26, 1932 |
| 1,939,038 | Bower et al. | Dec. 12, 1933 |
| 1,981,147 | Moller | Nov. 20, 1934 |
| 2,002,705 | Moller | May 28, 1935 |
| 2,143,716 | Scaife | Jan. 10, 1939 |
| 2,380,039 | Gideon | July 10, 1945 |